No. 880,557. PATENTED MAR. 3, 1908.
J. R. MEECE.
LOG TURNER.
APPLICATION FILED JUNE 8, 1907.
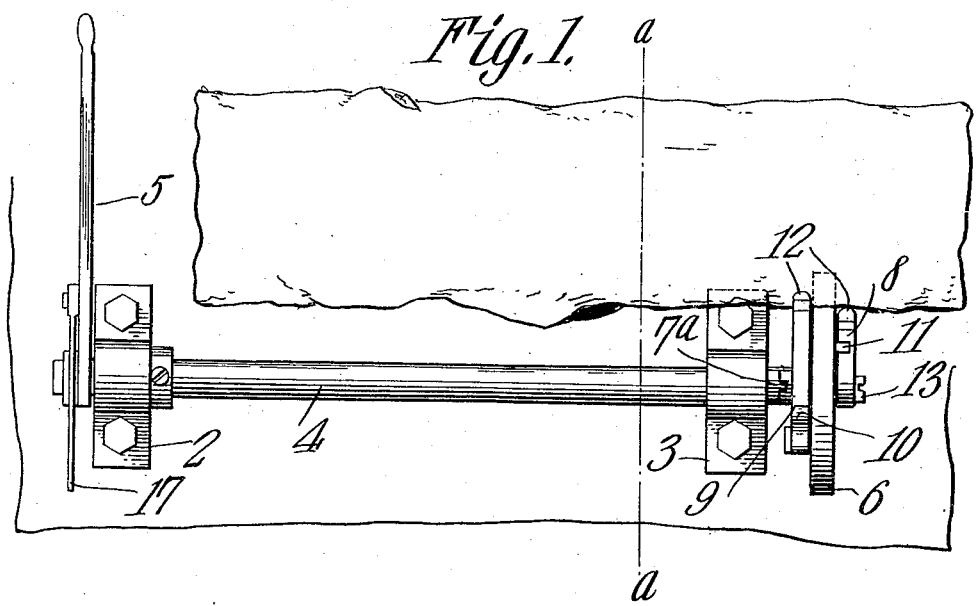
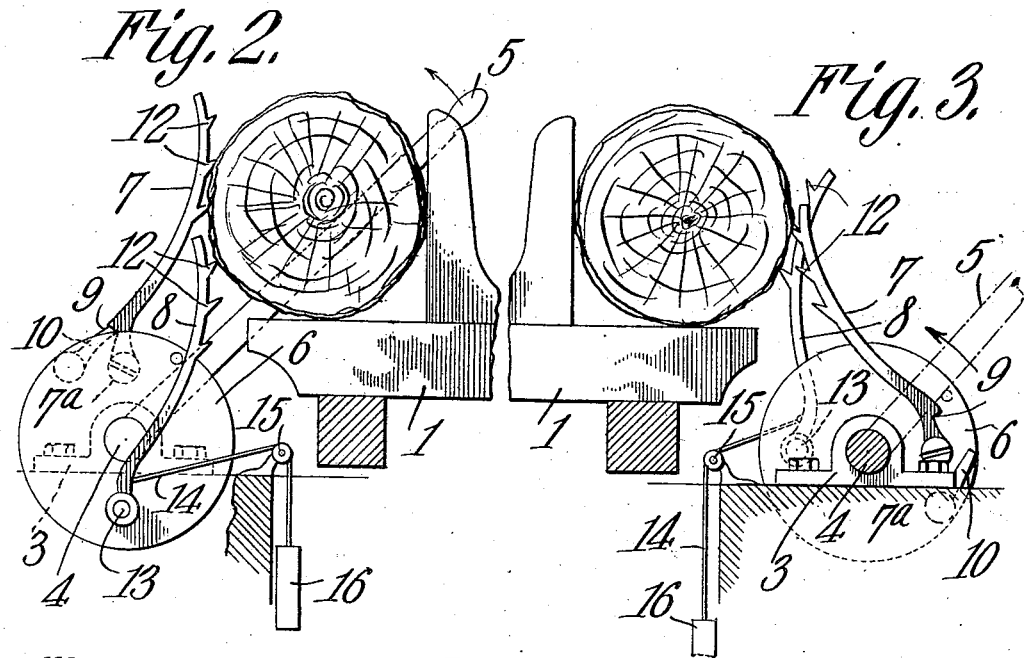
James R. Meece, INVENTOR.

UNITED STATES PATENT OFFICE.

JAMES ROBERT MEECE, OF ROSMAN, NORTH CAROLINA.

LOG-TURNER.

No. 880,557.	Specification of Letters Patent.	Patented March 3, 1908.

Application filed June 8, 1907. Serial No. 377,967.

*To all whom it may concern:*

Be it known that I, JAMES ROBERT MEECE, a citizen of the United States, residing at Rosman, in the county of Transylvania and State of North Carolina, have invented a new and useful Log-Turner, of which the following is a specification.

This invention relates to an attachment particularly adapted for use in connection with a portable saw mill for turning logs on the longitudinally movable carriage.

The invention may be used also with stationary saw mills.

The object of the invention is to provide a simple, strong and direct actuating mechanism for turning logs on saw mill carriages, which may be operated manually or by power.

Generally speaking the mechanism comprises a horizontal shaft having a wrist plate at one end on which toothed bars or dogs are pivoted that act alternately on the log to turn it when the horizontal shaft is rocked either by manual operating or by power.

In the accompanying drawings: Figure 1 is a top plan view of the log turner. Fig. 2 is an end elevation of the same. Fig. 3 is a view in cross section on the line a—a Fig. 1 showing the operating mechanism in position opposite to that of Fig. 2.

Similar numerals of reference are used to point out the same parts in all the figures.

Bolted to the floor or other suitable support near a saw mill carriage 1, are spaced bearings 2 and 3 in which a horizontal shaft 4, longitudinally disposed with relation to the carriage, is journaled. On one end of the shaft 4 is fixed a hand lever 5, by means of which the shaft 4 is rocked in its bearings. The opposite end of the shaft 4 carries a wrist plate 6 keyed thereto on which are pivoted two toothed bars or dogs 7 and 8, one on each face of said wrist plate near its periphery and diametrically disposed at equal distances from the axis of the shaft. The dog 7 has, near its pivot 7ª, a notch or tooth 9 to engage a pawl 10 pivoted on the same side of the wrist plate as the dog. Projecting from the opposite side of the wrist plate 6 is a stop pin 11 to engage with the dog 8 at certain times and for a purpose to be hereinafter described.

The dogs 7 and 8 are preferably curved as shown and have on their inner sides a plurality of teeth 12 which engage the side of a log or piece of timber on their upward movement and turn it on the carriage.

Fastened to the dog 8 preferably near its pivot 13 is a cord or chain 14, which, passing over a pulley 15 secured on a fixed support below the log carriage 1, is attached to a weight 16 sufficiently heavy to prevent the dog 8 falling rearwardly when it is raised to the position represented in Fig. 3.

To operate the log turner, let it be assumed that a log is in place on a saw mill carriage 1 and the dogs 7 and 8 are in the position shown in Fig. 2. If, now, the handle 5 be moved to the left, to rock the shaft 3, the wrist plate will turn in the same direction, raising the dog 8 the teeth of which, engaging the log, move it on its axis for a short distance. The dog 7 at the same time will be drawn downwardly by the wrist plate into position to act on the log at the completion of the upward stroke of the dog 8, which latter is prevented from swinging away from the log by the weight 16 holding the teeth of the dog closely against the log during the full period of the stroke. When the dog 8 reaches the limit of its movement the pin 11 will strike the dog and stop the movement of the hand lever 5. The dog 7 at this time will be in its lowermost position, the pawl 10 disengaged from the notch or tooth 9 and its teeth 12 in contact with the log as in Fig. 3. The handle 5 is now moved to the left and the dog 7, as it rises, catches the log and turns it until the pawl 10, dropping on the dog engages the notch or tooth 9 and stops the movement of the parts, with the dog 7 raised to its highest position.

The log turner may be operated mechanically if desired by means of a link 17 (shown in Fig. 1), pivoted to the hand lever 5, or by other means on the shaft 4, leading to a suitable source of power.

Having thus described the invention what is claimed is:—

1. A log turner comprising a horizontal rocking shaft, a wrist plate thereon, toothed dogs pivoted to said wrist plate, a stop to limit the operative movement of each dog projecting from said wrist plate, and means for rocking said shaft.

2. A log turner comprising a shaft and means for rocking the same, a wrist plate fixed to one end of said shaft, a toothed dog pivoted to said wrist plate on each face, a pawl for limiting the operative movement of one of said dogs and the movement of the hand lever in one direction, and a stop pin for acting in like manner on the other dog and arresting the hand lever as it is moved in the opposite direction.

3. A log turner comprising a horizontal shaft, a hand lever thereon for rocking the same, a disk or wrist plate keyed to said shaft, a toothed dog pivoted on each side of said disk in a diametrical line and equally spaced from the axis of said disk, one of said dogs having a notch or tooth, a pawl pivoted on the same side of the disk to engage said notch or tooth, and a projecting pin on the opposite side of said plate for contacting with the dog pivoted thereon at the completion of its operative movement.

In testimony that I claim the foregoing as my own, I have hereto affixed my signature in the presence of two witnesses.

JAMES ROBERT MEECE.

Witnesses:
W. J. WALLIS,
WELCH GALLOWAY.